United States Patent
Becker et al.

(10) Patent No.: US 9,656,393 B2
(45) Date of Patent: May 23, 2017

(54) GRIPPING OR CLAMPING DEVICE FOR GRIPPING OR CLAMPING OBJECTS AND METHOD THEREFOR

(71) Applicant: Schunk GmbH & Co. KG Spann- und Greiftechnik, Lauffen am Neckar (DE)

(72) Inventors: Ralf Becker, Marbach (DE); Michael Drab, Goeppingen (DE); Matthias Quaas, Abstatt/Happenbach (DE)

(73) Assignee: Schunk GmbH & Co. KG Spann-und Greiftechnik, Lauffen am Neckar (DE)

( * ) Notice: Subject to any disclaimer, the term of this patent is extended or adjusted under 35 U.S.C. 154(b) by 0 days.

(21) Appl. No.: 14/895,133

(22) PCT Filed: Jun. 17, 2014

(86) PCT No.: PCT/EP2014/062652
§ 371 (c)(1),
(2) Date: Dec. 1, 2015

(87) PCT Pub. No.: WO2014/202568
PCT Pub. Date: Dec. 24, 2014

(65) Prior Publication Data
US 2016/0114490 A1 Apr. 28, 2016

(30) Foreign Application Priority Data
Jun. 19, 2013 (DE) .................. 10 2013 211 528

(51) Int. Cl.
*B25J 15/02* (2006.01)
*B25J 15/00* (2006.01)
*B25J 15/08* (2006.01)

(52) U.S. Cl.
CPC .......... *B25J 15/0028* (2013.01); *B25J 15/02* (2013.01); *B25J 15/026* (2013.01); *B25J 15/083* (2013.01)

(58) Field of Classification Search
CPC .... B25J 15/0028; B25J 15/02; B25J 15/0213; B25J 15/0253; B25J 15/026; B25J 15/083;
(Continued)

(56) References Cited

U.S. PATENT DOCUMENTS 2,861,700 A   11/1958   James
4,707,013 A * 11/1987   Vranish .................. B25J 15/026
                                              294/119.1
(Continued)

FOREIGN PATENT DOCUMENTS

DE         10048662 A1   4/2001
DE       102011084177    4/2013
(Continued)

OTHER PUBLICATIONS

EP0134819 English Language Abstract (2 pages).
(Continued)

*Primary Examiner* — Dean Kramer
(74) *Attorney, Agent, or Firm* — Ware, Fressola, Maguire & Barber LLP

(57) ABSTRACT

A gripping/clamping device for gripping/clamping objects includes a drive that drives an actuator, and a jaw movably coupled to the actuator. An elastically deformable spring element is provided between the actuator and the jaw. A braking unit is provided, by either the actuator, or a movably coupled component provided between the actuator and the drive, that is fixed when an object is gripped. The elastically deformable spring element is elastically deformed. The drive has a rotating drive shaft. The braking unit fixes the
(Continued)

rotating drive shaft. A drive transmission with an output shaft is downstream of the drive shaft. The drive transmission is provided between the drive and the actuator. The actuator is a pinion that rotates about a rotational axis. The elastically deformable spring element is provided between the jaw and a gear rack section disposed on the jaw meshing with the pinion.

20 Claims, 2 Drawing Sheets

(58) Field of Classification Search
CPC .... B25J 19/0004; B25J 13/081; B25J 13/082; B25J 13/088; Y10S 901/38
USPC ...................................................... 294/119.1
See application file for complete search history.

(56) References Cited

U.S. PATENT DOCUMENTS

| | | | |
|---|---|---|---|
| 4,808,898 A * | 2/1989 | Pearson | ................ B25J 9/1015 294/119.1 |
| 6,331,758 B1 | 12/2001 | Takanashi et al. | |
| 8,172,048 B2 * | 5/2012 | Jonsson | ............... B25J 19/0004 188/158 |
| 2008/0181757 A1 * | 7/2008 | Wheeler | .................. B25J 9/104 414/738 |

FOREIGN PATENT DOCUMENTS

| | | |
|---|---|---|
| EP | 0134819 | 3/1985 |
| JP | 2009-202332 A | 9/2009 |
| WO | 2011111601 | 9/2011 |
| WO | 2013/050607 A1 | 4/2013 |

OTHER PUBLICATIONS

DE102011084177 English Language Abstract (1 page).
WO2011111601 English Language Abstract (1 page).
Abstract of JP2009202332A.
English Language Abstract of DE10048662A1.

* cited by examiner

GRIPPING OR CLAMPING DEVICE FOR GRIPPING OR CLAMPING OBJECTS AND METHOD THEREFOR

CROSS-REFERENCE TO RELATED APPLICATIONS

This application corresponds to international patent application serial no. PCT/EP2014/062652, filed 17 Jun. 2014, which claims benefit to German application no. 10 2013 211 528.8, filed 19 Jun. 2013, which are all incorporated by reference in their entirety.

BACKGROUND OF THE INVENTION

1. Field of Invention

Gripping or clamping device for gripping or clamping objects and method therefor.

The invention relates to a gripping or clamping device for gripping or clamping objects, with an actuator and a drive that drives the actuator, with at least one jaw that is movably coupled with the actuator and is traversable by means of a jaw guide along a base part, wherein an elastically deformable spring element is provided between the actuator and the jaw.

2. Description of Related Art

Such type of gripping or clamping devices are already known from DE 100 48 673 A1 or DE 10 2011 084 177 A1.

In such type of gripping or clamping devices, the spring element is used in particular to attenuate any occurring pulsating forces and therefore increase the service life of the crimping and clamping device.

SUMMARY OF THE INVENTION

The objective of the invention thus is to develop such type of gripping or clamping device.

This object is solved with a gripping or clamping device with the features recited in claim 1. Such a type of gripping or clamping device therefore provides that a braking unit is provided by means of which the actuator, or a component that is movably coupled to the actuator and is provided between the actuator and the drive, can be fixed when the object is gripped and the spring element is elastically deformed. Because of the retractive force of the elastically deformed spring element, a prestressing force can be provided, with which the object is gripped. This object can in particular even be gripped reliably when the drive is switched off or fails. As a result, it is provided that the clamping force is maintained.

In particular, when the actuator or the interacting, movably coupled component is fixed, when the maximum deformation, or at least almost the maximum deformation of the spring element is reached, a gripping force can be provided that is greater than a gripping force that is purely provided with the drive. The reason this is possible is because the kinetic energy of the moving mass for increasing gripping force can be stored in the spring element and is even available when the actuator or a corresponding component is fixed and the drive is switched off.

The spring element is advantageously disposed between the actuator and the jaw under preloading.

The spring element can in particular be realized as elastomeric damper. For this purpose, elastomeric blocks, elastomeric balls, elastomeric rings or elastomeric tubing were found to be advantageous.

It is particularly advantageous, if the elastic deformation and the elastic recovery of the spring element resulting therefrom is greater at the gripped object than the play between the fixed actuator or between the fixed component and the spring element. In this way, it can be ensured that the gripped object cannot be released with a fixed actuator or component, since any potentially present play is offset by any potentially occurring elastic recovery of the spring element in line with gripping force.

It is furthermore advantageous, if a control unit is provided which activates the braking unit when the object is gripped and the spring element is deformed elastically.

It is also advantageous, if the control unit controls the braking unit in such a way that the brake is also activated when the control unit detects a power failure. Any movement of the jaws is therefore prevented during a power failure.

The control unit can moreover communicate with sensor means which can detect deformation of the spring element. In this context, the deformation can be detected indirectly or directly.

The sensor means can in particular be designed as pressure measuring devices for detecting the pressure acting on the spring element and therefore the deformation of the spring element.

Furthermore it is conceivable that the sensor means are displacement measurement means with which the position of the jaw, and therefore the deformation of the spring element, can be detected Furthermore it is advantageous if the drive is designed as electric motor and if the sensor means are current measurement means with which, using the current consumption of the electric motor, the gripping force and therefore the deformation of the spring element can be detected.

Advantageously, the drive can have a rotational drive shaft, wherein the braking unit is then designed such that it fixes the drive shaft. The drive shaft then forms the fixable component provided between the actuator and the drive shaft. For this purpose, the drive shaft can be fixed in particular by clamping.

The drive shaft can have two free ends, wherein the one free end interacts with the actuator and the other free end interacts with the braking unit. Such type of configuration can be realized comparatively compact saving space and maintaining functional reliability, nevertheless.

To provide an optimal gripping force, it is conceivable that a drive transmission with a driveshaft is provided between the drive and the actuator, and that the braking unit acts on the driveshaft.

It is furthermore conceivable that a drive transmission is provided between the drive and the actuator in such a way that it forms the braking unit, in that it has self-retention, based on which the actuator or the movably coupled component with the actuator, is kept in the gripping position. This has the advantage that no additional controllable braking unit is required. For that purpose, any play that arises because of the self-retention, must be selected such that it is less than the elastic recovery of the spring element.

The actuator as such can also be designed as a pinion that can be rotated about a rotational axis, wherein the spring element can in particular be provided between the jaw and a gear rack section on the jaw meshing with the pinion.

On the other hand, it is conceivable that the actuator is designed as a pinion which can be rotated about a rotational axis, wherein the spring element between the rotational axis and the pinion can in particular also be designed as an elastomeric ring or elastomeric bush. Such type of spring element is then subjected to torque. In that context, the pinion can also mesh with a gear rack section disposed on the jaw.

In the event that at least one gear rack section is provided on the jaw, it is conceivable that a target value gear rack section has two opposing narrow sides extending transversely to the direction of movement of the jaw, each of which interacts with one spring element. For that purpose, the spring elements act on the gear rack section on the one hand, and on the other act on the jaw. In this instance, the spring elements are subjected to load in the longitudinal direction, that is, in the direction of movement of the jaws.

The problem mentioned at the outset is also solved by a method for operating in particular a gripping or clamping device according to the present invention. Such type of method is characterized by the following steps:

actuating the drive for traversing the jaw toward the object to be gripped, fixing the actuator or a component movably coupled component with the actuator provided between the actuator and the drive, that is, when the object is gripped and the spring element is deformed elastically.

The fixing of the actuator or the respective component can in particular be by means of a braking device.

Further developments and advantageous embodiments of the present invention can be found in the subsequent specification, by means of which an exemplary embodiment of the present invention is described and discussed in detail.

DETAILED DESCRIPTION OF THE INVENTION

Figure 1:
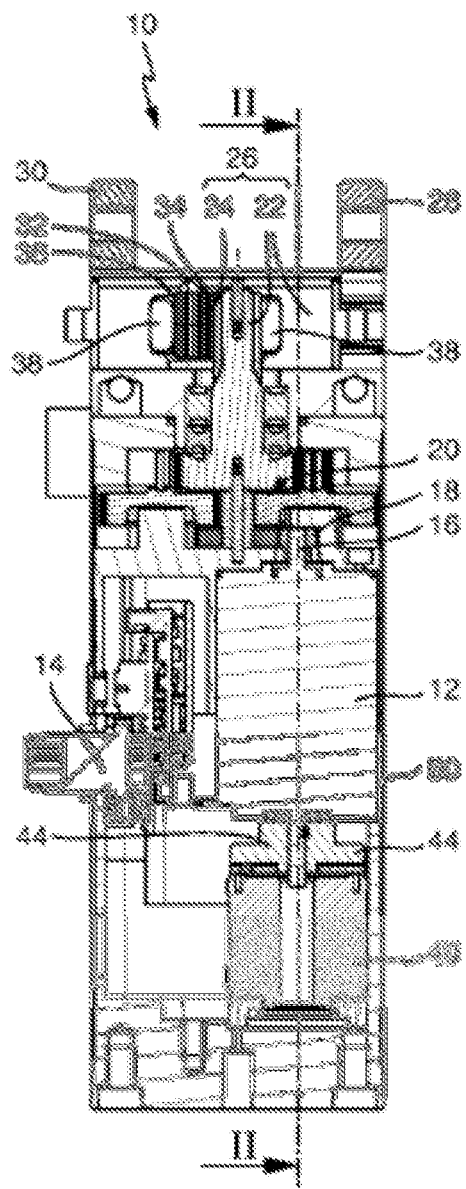
FIG. 1 is a longitudinal section through a clamping device according to the present invention corresponding to the line I-I in FIG. 2.

The figures show a clamping device 10 according to the present invention, which includes a drive 12 in form of an electric motor. A control unit 14 is provided for activating the drive 12. The drive has a drive shaft 16, at the one free end of which a pinion 18 is provided. A drive transmission 20 in the form of a spur gear transmission is downstream of the pinion 18. The drive transmission 20 includes an output shaft 22 with a pinion 24. In this context, the output shaft 22 with the pinion 24 forms and actuator 26, by means of which two reciprocally opposite jaws 28, 30 can be driven.

The jaws 28, 30 respectively provide one recess 32, in each of which one gear rack section 34 is accommodated. For this purpose, the gear rack sections 34 respectively have two reciprocally opposite narrow sides 36, which extend transverse to the direction of movement of the respective jaw 28, 30, each of which narrow sides interacts with a spring element 38 supported on the respective jaw 28, 30. Consequently, two spring elements 38 are provided on each jaw 28, 30, between which one gear rack section 34 each is provided in the direction of movement of the jaw. Two spring elements 38 on the jaw 30 can be seen in the section according to FIG. 1.

The actuator 26 is therefore driven via the drive transmission 20 when the drive 12 is activated by means of the control unit 14. The jaws 28, 30 are moved in opposite directions along their respective direction of movement by means of the actuator 26, or by its pinion 24.

The spring elements 38, which can in particular be designed as resilient elastomeric blocks, are elastically deformed flexibly when an object is gripped with the jaws 28, 30. In this way, any force impulses which occur when the jaws 28, 30 impinge on the object to be clamped, can be damped.

The clamping device 10 includes a braking unit 40, which can also be controlled by means of the control unit 14. Actuator 26 can be fixed indirectly via the braking unit 40. For this purpose, the drive 12 or its drive shaft 16 provides a free end 42 on the side facing away from the pinion 18, which free end can be fixed by the braking unit 40. In this context, the braking unit 40 can provide clamping jaws 44, which act against the shaft end 42, fixing it and therefore also the actuator 26, when the braking unit 40 is actuated.

The shaft end 42 is in particular fixed when the object to be gripped is gripped and the spring elements 38 are deformed elastically. This has the advantage that preservation of clamping force is then provided because of the elastic resilience or retractive force of the spring elements 38, if the drive 12 is not actuated.

Any existing play between the mechanically coupled components, that is a play, which results from the play of the drive 12, from the drive transmission 20 and from the interaction of the pinion 24 with the gear rack sections 34, where the play is preferably less than the elastic deformation or elastic recovery of the respective spring elements 38 in the gripped condition. As a result, it can be ensured that a secure grip of the gripped object is possible nevertheless, even if the drive is switched off or has failed.

It is furthermore advantageous, if sensor means are provided by means of which a deformation of the spring elements 38 and consequently secure gripping of the objects to be gripped can be detected. Sensor means to be considered are in particular pressure measuring devices, by means of which the pressure acting on the respective spring element 38 can be measured. Moreover, displacement measurement means are conceivable with which the position of the respective jaw 28, 30 can be detected. Also current measurement means are conceivable from which the respective gripping force can be concluded and therefore also the deformation of the respective spring element 38, by means of the current consumption of the electric motor 12.

Figure 2:
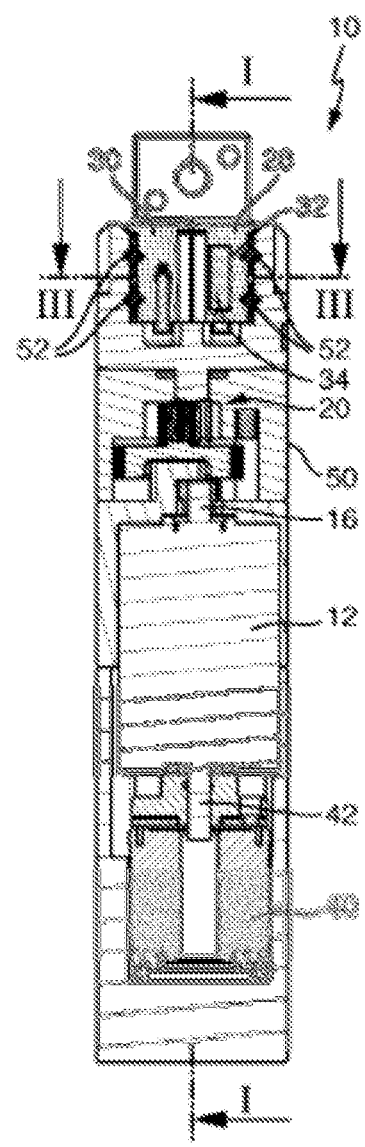
FIG. 2 is a cross-section through the device according to FIG. 1 along the line II-II.

As becomes clear from FIGS. 1 and 2, all components of the clamping device 10 are accommodated in one housing 50. Also the jaws 28 and 30 are disposed traversable in their respective axial position by means of positioning means 52 in housing 50.

Figure 3:
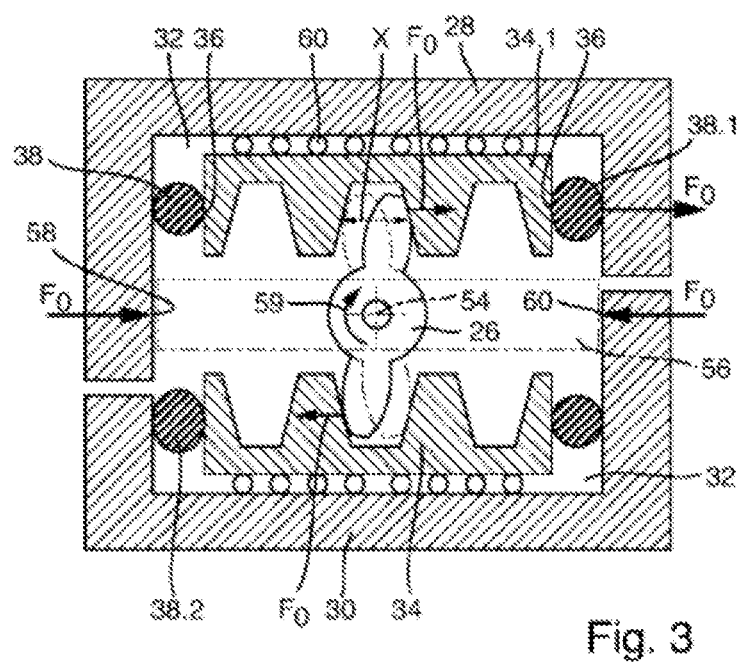
FIG. 3 is a schematic representation of a section along the line III-III according to FIG. 2.

FIG. 3 schematically illustrates the gripping position of the clamping device 10. Illustrated in a simplified manner is the actuator 26, which can be rotated about its rotational axis 54 from drive 12 via the drive transmission 20. Furthermore, an object 56 which is gripped by the jaws 28, 30, is illustrated Between the actuator 26 and the jaws 28, 30, the gear rack section 34 disposed on the jaws is provided respectively, which gear rack section is movable relative to the jaws 28, 30 in direction of movement of the jaws 28, 30. The spring elements 38 can be clearly seen between the respective opposite narrow sides 36 of the gear rack sections 34.

In this context, the gear rack sections 34 are supported in the respective recesses 32 of the jaws 28, 30 using suitable sliding means 52.

To grip the object 56, the positioner 26 is rotated in direction of the arrow 59.

This rotated position of the actuator 26 is illustrated in FIG. 3; the left position of the actuator 26 is represented by a dot-dash line. Because of the rotational movement of the actuator 26, the gear rack section 34.1 in FIG. 3 is moved to the right on the one hand, and a gripping force $F_O$ is applied on the spring element 38.1 because of the impingement on the workpiece. This results in an elastically flexible deformation of the spring element 38.1. FIG. 3 illustrates this deformation of the spring element 38.1.

This gripping force F, is then introduced into the jaw 28 by means of the spring element 38.1. This gripping force F, from the jaw 28 is then introduced into the object 58 to be gripped on the position 58.

A corresponding gripping force $F_O$ from the jaw 30 is then introduced accordingly into the object 56 to be gripped at the position 60. In the illustrated gripping position, the two reciprocally diagonally opposite spring elements 38.1 and 38.2 are therefore flexibly deformed elastically.

By using the braking unit (not illustrated) in FIG. 3, the positioner 26 is fixed directly, or as illustrated in FIGS. 1 and 2 indirectly, by means of the drive transmission 20 and the drive 12. In this context, because of the existing play, it is conceivable that the actuator 26 is rotated in reverse by a distance x against the force $F_O$ acting on the position 58. This resetting movement of the actuator 26 by the distance x is compensated by elastic recovery of the spring element 38.1, so that the jaw 28 does not change its absolute position because of the resetting movement of the positioner 26. This applies accordingly for the jaw 30. In this context, the elastic deformation of the spring element 38 during gripping must be selected such that in spite of a resetting movement by the distance x there is sufficient gripping force available to securely grip object 56, even if the braking unit is activated and the drive is deactivated or fails.

Moreover it is conceivable to attain increased gripping force. This can ensue by utilizing the kinetic energy of the actuator 26. In particular, when the actuator 26 is fixed by the braking unit when the deformation of the spring elements 38 is maximal, an increase in gripping force can be provided.

The invention claimed is:

1. A gripping or clamping device (10) for gripping or clamping objects (56), with an actuator (26) and a drive (12) that drives the actuator (26), with at least one jaw (28, 30) that is movably coupled to the actuator (26), wherein an elastically deformable spring element (38) is provided between the actuator (26) and the at least one jaw (28, 30), wherein a braking unit (40) is provided, by means of which the actuator (26), or a movably coupled component (42) provided between the actuator (26) and the drive (12), can be fixed when an object (56) is gripped and the elastically deformable spring element (38) is elastically deformed, characterized in that the drive (12) has a rotating drive shaft (16), wherein the braking unit (40) fixes the rotating drive shaft (16), and that a drive transmission (20) with an output shaft (22) is downstream of the drive shaft (16), wherein the drive transmission (20) is provided between the drive (12) and the actuator (26); and the actuator (26) is configured as a pinion (24) that can be rotated about a rotational axis, wherein the elastically deformable spring element (38) is provided between the at least one jaw (28,30) and a gear rack section (34) that is disposed on the jaw meshing with the pinion (24).

2. The gripping or clamping device (10) according to claim 1, characterized in that the elastically deformable spring element (38) is designed as an elastomeric damper and is disposed under preloading between the actuator (26) and the at least one jaw (28, 30).

3. The gripping or clamping device (10) according to claim 1, characterized in that the elastic deformation of the elastically deformable spring element (38) is greater when the object (56) is gripped than the play of the fixed actuator (26).

4. The gripping or clamping device (10) according to claim 1, characterized in that the gripping or clamping device (10) comprises a control unit (14) which activates the braking unit (40) when the object (56) is gripped and the elastically deformable spring element (38) is elastically deformed.

5. The gripping or clamping device (10) according to claim 4, characterized in that the control unit (14) controls the braking unit (40) in such a way that the braking unit (40) is activated when the control unit (14) detects a power failure.

6. The gripping or clamping device (10) according to claim 5, characterized in that the control unit (14) activates the braking unit (40) in such a way that kinetic energy occurring because of a moving mass is stored in the elastically deformable spring element (38) in order to increase the gripping force.

7. The gripping or clamping device (10) according to claim 5, characterized in that the control unit (14) communicates with sensor means with which a deformation of the elastically deformable spring element (38) can be detected.

8. The gripping or clamping device (10) according to claim 7 characterized in that the sensor means are pressure measuring devices, with which the pressure acting on the elastically deformable spring element (38) and thus the deformation of the elastically deformable spring element (38) can be detected.

9. The gripping or clamping device (10) according to claim 7 characterized in that the sensor means are displacement measurement means with which the position of the at least one jaw (28, 30) and thus the deformation of the elastically deformable spring element (38) can be detected.

10. The gripping or clamping device (10) according to claim 4, characterized in that the control unit (14) activates the braking unit (40) in such a way that kinetic energy occurring because of a moving mass is stored in the elastically deformable spring element (38) in order to increase the gripping force.

11. The gripping or clamping device (10) according to claim 4, characterized in that the control unit (14) communicates with sensor means with which a deformation of the elastically deformable spring element (38) can be detected.

12. The gripping or clamping device (10) according to claim 11, characterized in that the sensor means are pressure measuring devices, with which the pressure acting on the elastically deformable spring element (38) and thus the deformation of the elastically deformable spring element (38) can be detected.

13. The gripping or clamping device (10) according to claim 11, characterized in that the sensor means are displacement measurement means with which the position of the at least one jaw (28, 30) and thus the deformation of the elastically deformable spring element (38) can be detected.

14. The gripping or clamping device (10) according to claim 11, characterized in that the drive (12) is designed as electric motor and that the sensor means are current measurement means, with which, using the current consumption of the electric motor, the gripping force and therefore the deformation of the elastically deformable spring element (38) can be detected.

15. The gripping or clamping device (10) according to claim 14, characterized in that the drive shaft (16) comprises two free ends, and wherein one of the two free ends interacts with the actuator (26) and another one of the two free ends (42) interacts with the braking unit (40).

16. The gripping or clamping device (10) according to claim 1, characterized in that the gear rack section (34) comprises two opposing narrow sides (36) extending transversely to the direction of movement of the at least one jaw (28, 30), each of the two opposing narrow sides (36) interacts with one elastically deformable spring element (38).

17. A method for operating a gripping or clamping device as recited in claim 1, wherein the method comprises steps for;
- actuating the drive (12) for traversing the jaw (28, 30) toward the object (56) to be gripped, and
- fixing the actuator (26) or a component (42) movably coupled with the actuator provided between the actuator (26) and the drive (12) when the object (56) is gripped and the spring element (38) is elastically deformed.

18. The method according to claim 17, wherein the step of fixing the actuator (26) or the component (42) is done so that kinetic energy occurring because of a moving mass is stored in the elastically deformable spring element (38) in order to increase the gripping force.

19. A gripping or clamping device (10) for gripping or clamping objects (56), with an actuator (26) and a drive (12) that drives the actuator (26), with at least one jaw (28,30) that is movably coupled to the actuator (26), wherein an elastically deformable spring element (38) is provided between the actuator (26) and the at least one jaw (28,30), wherein a braking unit (40) is provided, by means of which the actuator (26),or a movably coupled component (42) provided between the actuator (26), and the drive (12), can be fixed when an object (56) is gripped and the elastically deformable spring element (38) is elastically deformed, characterized in that the drive (12) has a rotating drive shaft (16). Wherein the braking unit (40) fixes the rotating drive shaft (16), and that a drive transmission (20) with an output shaft (22) is downstream of the drive shaft (16),wherein the drive transmission (20) is provided between the drive (12) and the actuator (26); and the actuator (26) is developed as a pinion (24) that can be rotated about a rotational axis, wherein the elastically deformable spring element (38) is provided between the rotational axis and the pinion (24).

20. A method for operating a gripping or clamping device as recited in claim 19, wherein the method comprises steps for:
- actuating the drive (12) for traversing the jaw (28, 30) toward the object (56) to be gripped, and
- fixing the actuator (26) or a component (42) movably coupled with the actuator provided between the actuator (26) and the drive (12) when the object (56) is gripped and the spring element (38) is elastically deformed.

* * * * *